(12) United States Patent
Cann

(10) Patent No.: US 7,570,475 B2
(45) Date of Patent: Aug. 4, 2009

(54) COWLING ASSEMBLY

(75) Inventor: Martin Cann, Somersset (GB)

(73) Assignee: Westland Helicopters Limited, Yeovil, Somerset (GB)

( * ) Notice: Subject to any disclaimer, the term of this patent is extended or adjusted under 35 U.S.C. 154(b) by 341 days.

(21) Appl. No.: 11/481,695

(22) Filed: Jul. 6, 2006

(65) Prior Publication Data

US 2007/0014071 A1    Jan. 18, 2007

(30) Foreign Application Priority Data

Jul. 12, 2005    (GB) ................................ 0514256.7

(51) Int. Cl.
H05F 3/00    (2006.01)
B64D 45/02    (2006.01)

(52) U.S. Cl. ...................... 361/218; 244/1 A
(58) Field of Classification Search ................. 361/218; 244/1 A
See application file for complete search history.

(56) References Cited

U.S. PATENT DOCUMENTS

| 2,982,494 | A | * | 5/1961 | Amason ..................... 244/1 A |
| 3,416,027 | A | * | 12/1968 | Amason et al. ................ 315/36 |
| 3,428,270 | A | * | 2/1969 | Knight ....................... 244/1 A |
| 3,586,209 | A | * | 6/1971 | Keller ........................ 222/627 |
| 4,080,643 | A | | 3/1978 | Cline ......................... 361/218 |
| 4,237,514 | A | * | 12/1980 | Cline ......................... 361/117 |
| 4,262,321 | A | | 4/1981 | Cline ......................... 361/218 |
| 4,506,311 | A | * | 3/1985 | Cline ......................... 361/218 |
| 4,583,702 | A | * | 4/1986 | Baldwin ..................... 244/1 A |
| 4,796,153 | A | * | 1/1989 | Amason et al. ............. 361/218 |
| 5,542,624 | A | * | 8/1996 | Smith ........................ 244/1 A |
| 5,862,032 | A | * | 1/1999 | Cann ......................... 361/217 |
| 7,120,004 | B2 | * | 10/2006 | Hall .......................... 361/218 |

FOREIGN PATENT DOCUMENTS

| EP | 0753458 | | 1/1997 |
| EP | 0753458 | A1 | 1/1997 |
| FR | 2675767 | A1 | 10/1992 |
| GB | 2295594 | | 6/1996 |
| SU | 620162 | A * | 9/1982 |

* cited by examiner

Primary Examiner—Robert DeBeradinis
Assistant Examiner—Scott Bauer
(74) Attorney, Agent, or Firm—MacMillan, Sobanski & Todd, LLC

(57) ABSTRACT

A cowling assembly for a vehicle includes a generally external surface having secured thereto or adjacent thereto, an elongate lightning protection strip member. The lightning protection strip member includes a lightning diverter strip connected to a lightning conductor strip. The lightning diverter strip at least when subjected to high electric field, enabling an ionized channel to be established along the diverter strip to divert the lightning along the lightning diverter strip to the lightning conductor strip. The lightning conductor strip conducts the lightning from the lightning diverter strip to an earth of the vehicle.

11 Claims, 2 Drawing Sheets

COWLING ASSEMBLY

CROSS-REFERENCE TO RELATED APPLICATIONS

Priority is claimed to United Kingdom patent application Ser. No. 0514256.7 filed Jul. 12, 2005

STATEMENT REGARDING FEDERALLY SPONSORED RESEARCH OR DEVELOPMENT

Not Applicable.

TECHNICAL FIELD

This invention relates to a cowling assembly for a vehicle and more particularly, but not exclusively, to a forward cowling such as a nose cap assembly or a radome for an aircraft.

BACKGROUND OF THE INVENTION

Operational equipment such as radar and the like transmitting and sensory equipment, is commonly forwardly mounted on an aircraft, e.g. in the nose of the aircraft. The equipment is protected from the environment by a cowling or nose cap assembly which on most aircraft is constructed predominantly from material which is transparent to electromagnetic radiation at the operational frequencies of the equipment. Typically the cowling assembly is made of a fiber reinforced honeycomb structure. Such materials, however, do not provide protection against lightning which can puncture the nose cap assembly and cause severe damage to the electronics or sensory equipment.

For lightning protection, it is known to provide conductive strips on the general external surface of the nose cap assembly. The conducting strips are typically of a material and are of sufficient cross sectional area, to capture a leader channel of the lightning, and conduct it, for example, to the (metallic) air frame, so as to protect the nose cap assembly and the operational equipment behind it. Although the metallic conducting strips are efficient at providing lightning protection, they can interfere with the proper operation of the sensory equipment. For example, where the equipment is radar, the presence of metallic strips can obstruct the radar's view.

It also is known to utilize a lightning diverter strip consisting of metal elements which are insulated from one another. Such a strip may be made virtually, if not completely transparent to electromagnetic radiation under normal conditions. When subjected to high electrical field conditions, as can be experienced if the nose cap assembly is struck by lightning, the material enables an ionized channel to be established along the surface of the diverter strip to divert the attachment point of the lightning arc by extending the arc length along the path above its surface. The use of diverter strips may provide for less sufficient lightning protection than conducting strips of corresponding cross section. However, diverter strips are widely used in order to not obscure the reception of electromagnetic radiation by sensory equipment housed behind the cowling.

Where the cowling is large, such that very long diverter strips would be required to extend along the nose cap assembly external surface from a window position in front of the sensory equipment to the air frame, lightning diverter strips do not offer sufficient lightning protection. While lightning conductor strips could be used in the place of the lightning diverter strips, the conductive strips would then tend to obscure the window in front of the sensory equipment.

BRIEF SUMMARY OF THE INVENTION

According to one feature of the invention, a cowling assembly for a vehicle is provided to include a generally external surface having secured thereto or adjacent thereto, one or more elongate lightning protection strip members. At least some of the lightning protection strip members including a lightning diverter strip part and a lightning conductor strip part. The lightning diverter strip part, at least when subjected to high electric field, enables an ionized channel to be established along the diverter part to divert the lightning along the lightning diverter strip part to the lightning conductor strip part. The lightning conductor strip part conducts the lightning from the lightning diverter strip part to an electrical earth of the vehicle.

In an assembly in accordance with one embodiment, the length of lightning diverter strip part may be maintained sufficiently short that it will function in a proper manner to capture the lightning and prevent the lightning from puncturing the cowling assembly. The diverter strip part need only divert the lightning to the conductor strip part which may capture the lightning and conduct it to earth.

As used herein, "earth" means a position of common potential throughout a frame of the vehicle, such as the airframe where the vehicle is an aircraft, or the chassis or body where the vehicle is a land vehicle, or a hull where the vehicle is waterborne, rather than the ground.

By "strip" we mean a structure which is typically longer than the maximum dimension of its cross section, for example, at least ten times greater. Typically the diverter and conductor strip parts each have a width dimension along the surface of the cowling which is greater, for example, at least five times greater, than a height dimension being the extent to which the strip parts project upwardly from the external surface of the cowling assembly.

In one embodiment, the diverter strip part includes a plurality of conductive, usually metallic, elements each of relatively small length along the diverter strip part, which elements are insulated from one another along the diverter strip part. The conductor strip part preferably is metallic, for example, of copper or aluminum. The diverter and conductor strips may be connected together by at least one conductive connector, such as a rivet or other fastener, or by direct electrical contact.

The cowling assembly may include a window portion where maximum transparency to electromagnetic radiation is required. Electromagnetic radiation sensory equipment may be mounted behind the window portion, and at least the majority of the lightning protection strip member over the window portion are provided by the diverter strip part. Preferably the conductor strip part does not extend significantly over the window portion. The invention has particular but not exclusive application to a cowling assembly for an aircraft. It should be understood that it may be used for protecting electronics in other types of vehicles, or for radar or other electronics which is not on a vehicle but is located where it may be exposed to lightening.

According to one embodiment of the invention, an aircraft is provided with a cowling assembly according to the first aspect of the invention. The aircraft may include electromagnetic radiation sensory equipment mounted behind a window portion of the cowling assembly. The window extends over an area through which a significant proportion of electromagnetic radiation to be sensed by the sensory equipment, passes. The cowling assembly may be, for example, a nose cap assembly for the aircraft.

BRIEF DESCRIPTION OF THE DRAWINGS

FIG. 1a is an enlarged fragmentary view of part of a lightning diverter strip of the aircraft nose cap of FIG. 1.

DETAILED DESCRIPTION

Figure 1:
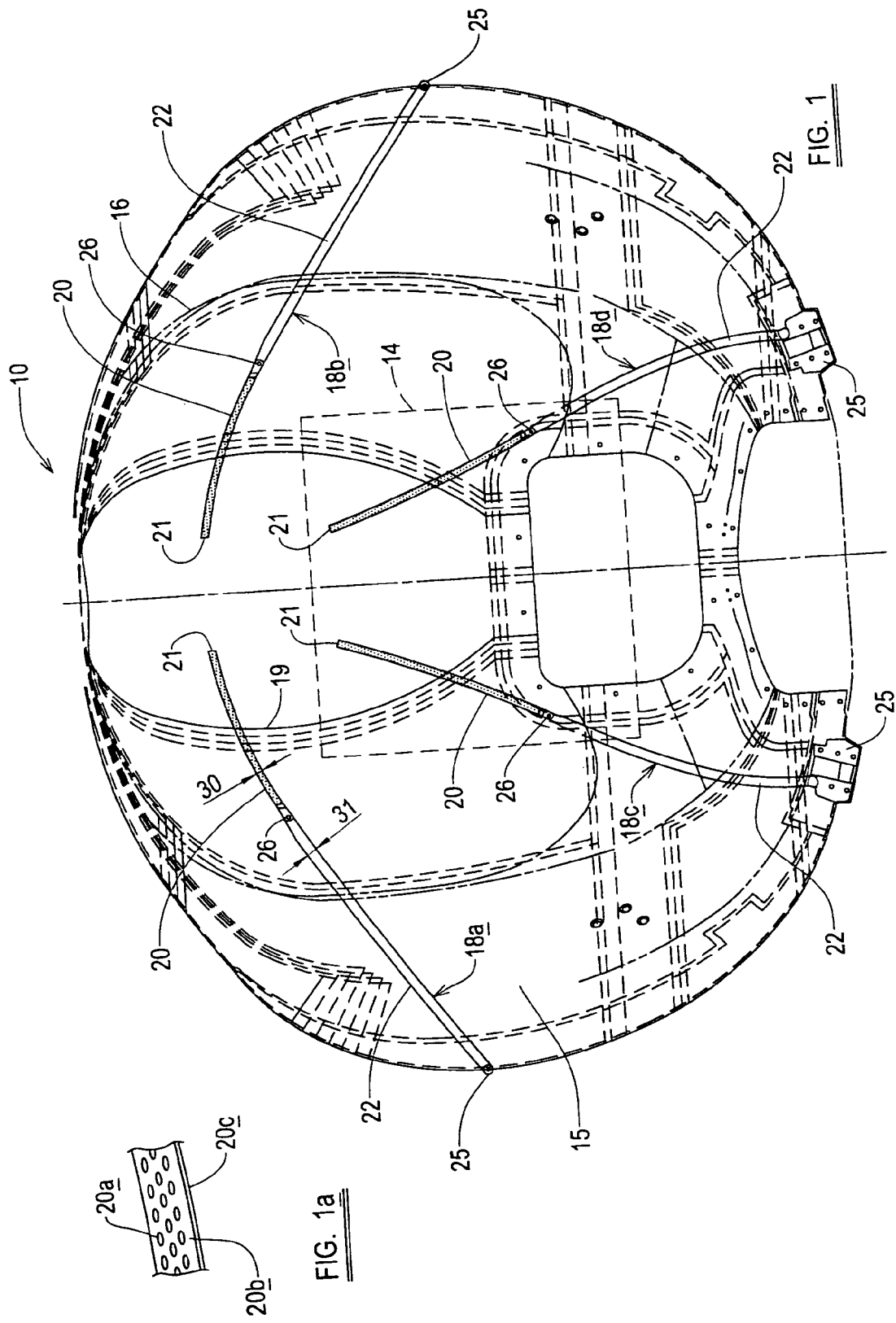
FIG. 1 is a is a front elevational view of a cowling assembly in accordance with one aspect of the invention in the form of an aircraft nose cap assembly.

Referring to the drawings, a cowling assembly 10 is shown in the form of a nose cap assembly for an aircraft 12 for mounting at a forward end of an airframe of the aircraft 12. The cowling assembly 10 provides protection against the environment for operation equipment, such as sensory equipment which senses electromagnetic radiation. In this example, the sensory equipment is radar equipment 14 which in use is mounted behind the cowling assembly 10. It should be understood that the type of electronic equipment protected by the cowling assembly 10 is not a part of the invention. The cowling assembly 10 is commonly known as a radome and typically is made as a fiber reinforced honeycomb structure which is generally transparent to electromagnetic radiation, at least at the operational frequencies of the radar or other sensory or transmitting equipment 14.

The cowling assembly 10 has a bulbous external surface 15. A window portion 16 is located immediately in front of the radar or other equipment 14 through which a significant proportion of electromagnetic radiation to be sensed by the equipment 14, passes.

To provide for lightning protection for the aircraft 12 and the equipment 14 behind the cowling assembly 10, the external surface 15 of the assembly 10 is provided with a plurality of lightning protection strip members 18a-18d.

Each lightning protection strip member 18a-18d includes a lightning diverter strip 20 and a lightning conductor strip 22 although in another embodiment, some lightning protection strip members 18a-18d which are only diverter strips and/or only conductor strips may be provided.

In accordance with one embodiment of the cowling assembly 10, the lightning protection strip members 18a-18d provide for a lightning strike on the cowling assembly 10 to be captured and first diverted e.g. from free ends 21 of the diverter strips 20, along the surface of the diverter strips 20 to the respective conductor strips 22 which each extend to an earth afforded by the airframe of the aircraft, as indicated at 25.

As shown in FIG. 1a, each diverter strip 20 includes a plurality of surface mounted metallic elements 20a in this example, each coated with an oxide or other resistive coating, and insulated from one another along the length of the diverter strip 20 by insulation 20b, and being provided as a surfacing on a layer of electrically resistive material 20c. The diverter strip 20 is secured to or at least adjacent to, the external surface 15 of the cowling assembly 10, as shown in FIG. 1. The general construction of such diverter strips is well established and actual details of the construction do not form any part of the present invention. The diverter strips 20 are however made so as not to obscure the window portion 16 and areas close to the window portion 16, through which a significant proportion of the electromagnetic radiation to be transmitted or sensed passes, i.e., the diverter strips 20 are of small cross section, so as to be at least virtually transparent to the electromagnetic radiation frequencies to be sensed.

The conductor strips 22 are electrically connected to their respective diverter strips 20, in this example by connective elements which in this example are rivets 26 or other fasteners, and the conductor strips 22 each extend to and electrically connect to the airframe earth 25.

In this example, the diverter strips 20 each have a free end 21 although in another example, the diverter strips 20 or at least some of them, may be connected at each end to a respective conductor strip 22.

The free ends 21 of the diverter strips 20 in the example illustrated are distant from the airframe 25, but in another example the diverter strips 20 may extend close to the airframe 25 in which case lightning which attaches to the diverter strips 20 may be diverted to the respective conductor strips 22 of the lightning protection members 18 to the airframe 25, or direct to the airframe 25 depending upon where on the cowling assembly 10, the lightning strike occurs.

It can be seen that in this example, the conductor strips 22 do not extend significantly over the window portion 16 or at least a crucial central area 19 thereof, and thus although the conductor strips 22 are not transparent to electromagnetic radiation to be sensed, the conductor strips 22 do not obscure or otherwise significantly interfere with the passage of electromagnetic radiation at least though the window portion 16 where the most significant proportion of the radiation passes. The conductor strips 22 may be made of copper or aluminum or any other very electrically conductive material.

The lightening protection strip members may be applied to a large cowling assembly 10 where, if the lightning protection strip members were wholly diverter strips, would provide inadequate lightning protection, or if they were wholly conductor strips would then interfere with the passage of electromagnetic radiation to the sensory equipment 14 mounted behind the cowling assembly 10.

In the example shown in FIG. 1, there are provided an upper pair of lightning protection strip members 18a, 18b, and a lower pair of lightning protection strip members 18c, 18d. However, more or less of the lightening protection strip members may be provided, as required by different shaped and different size cowling assemblies. The configuration of the window portion 16 over which desirably the conductor strips 22 do not significantly extend, will depend upon the nature of and position of the sensory or other operation equipment 14 mounted behind the cowling assembly 10. Preferably, the diverter strips 20 of the lightning protection strip members 18 extend for at least 50% of the lengths of each protection strip member, and each diverter strip 20 has a length which is at least ten times greater than the maximum cross sectional dimension, in this case the width dimensions 30 of the diverter strips 20.

The conductor strips 22 preferably each have a length which is at least ten times greater than the maximum cross sectional dimension, in this case the width dimensions 31 of the conductor strips 22, and preferably in both the diverter strips 20 and conductor strips 22, the widths of the strips 20, 22 which extend along the external surface 15 of the cowling assembly 10 each have a width dimension 30, 31 along the external surface 15 of the cowling 10 which is greater, and preferably at least five times greater, than a height dimension being the extent to which the strips 20, 22 project upwardly from the external surface 15.

Figure 2:
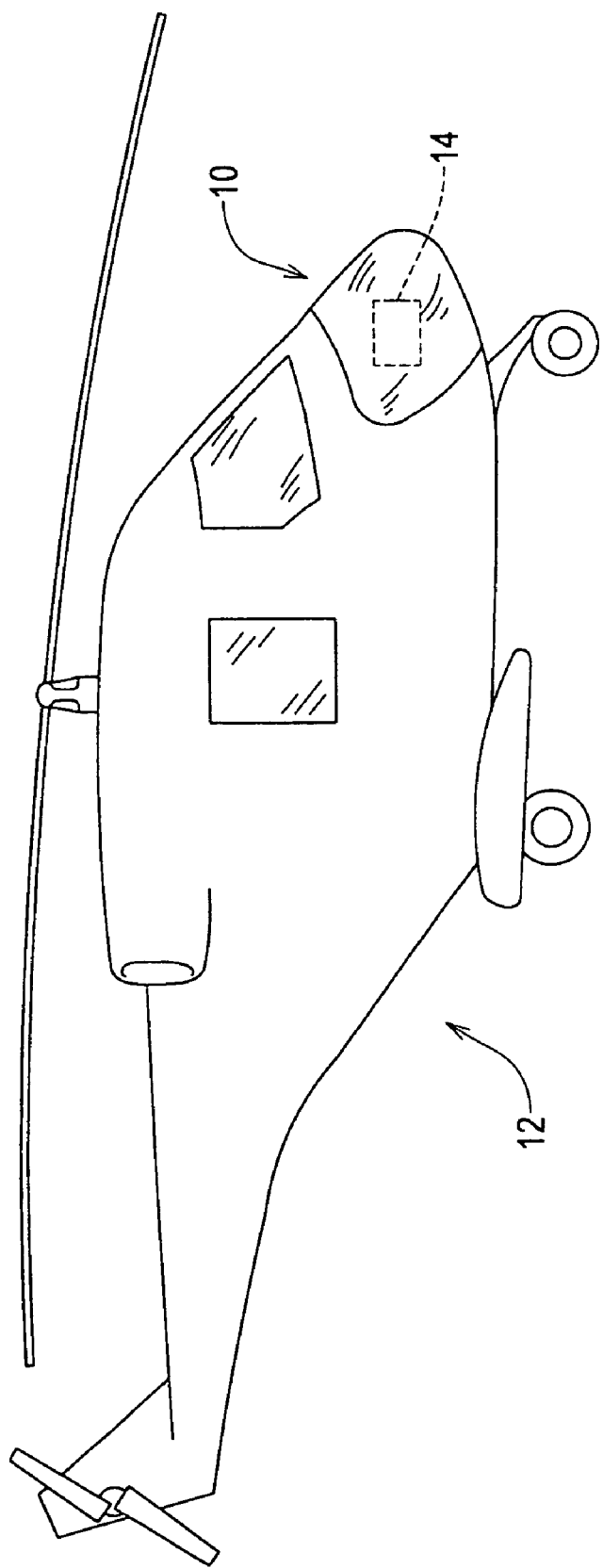
FIG. 2 is a is an side elevational view of an aircraft having a cowling assembly in accordance with the second aspect of the invention.

FIG. 2 shows the cowling assembly 10 mounted on the front of an aircraft 12 which, in this drawing, is illustrated as a helicopter. The cowling assembly 10 protects radar or other sensitive electronics mounted on the front of the helicopter.

Although the invention has been described in relation to a cowling assembly 10, and more particularly a nose cap assembly for an aircraft, the cowling assembly may be applied to other cowlings for aircraft or to other vehicles such as land vehicles or boats which have electronics located where they could be damages by lightening.

The invention claimed is:

1. A cowling assembly for a vehicle, the assembly including a generally external surface having secured thereto or adjacent thereto, at least one elongate lightning protection strip member, the lightning protection strip member including a lightning diverter strip and an electrically conductive lightning conductor strip, each of which extends over a part of the external surface of the cowling assembly, the lightning diverter strip at least when subjected to high electric field, enabling an ionized channel to be established along the lightening diverter strip to divert the lightning along the lightening diverter strip to the lightning conductor strip, and wherein the lightning conductor strip is connected to conduct the lightning from the lightning diverter strip to an earth of the vehicle.

2. A cowling assembly according to claim 1 wherein the diverter strip includes a plurality of conductive elements each of relatively small length along the diverter strip, which elements are insulated from one another along the diverter strip.

3. A cowling assembly according to claim 1 wherein the conductor strip is metallic.

4. A cowling assembly according to claim 1 wherein the diverter and conductor strips are connected together by at least one conductive connector.

5. A cowling assembly according to claim 4 wherein the conductive connector is a fastener.

6. A cowling assembly according to claim 1 wherein the external surface includes a window portion where maximum transparency to electromagnetic radiation is required, and at least the majority of the lightning protection strip member over the window portion is provided by at least one diverter strip.

7. A cowling assembly according to claim 6 wherein the conductor strip does not extend significantly over the window portion.

8. A cowling assembly according to claim 1 which is a cowling assembly for an aircraft.

9. An aircraft having a cowling assembly, the cowling assembly including a generally external surface having secured thereto or adjacent thereto, an elongate lightning protection strip member, the lightning protection strip member including a lightning diverter strip connected to a lightning conductor strip, each of which extends over a part of the external surface of the cowling assembly, the lightning diverter strip at least when subjected to high electric field, enabling an ionized channel to be established along the diverter strip to divert the lightning along the lightning diverter strip to the lightning conductor strip, the lightning conductor strip conducting the lightning from the lightning diverter strip to an earth of the aircraft.

10. An aircraft according to claim 9 wherein the aircraft includes electromagnetic radiation sensory equipment mounted behind a window portion of the external surface, the window portion extending over an area through which a significant proportion of electromagnetic radiation to be sensed by the sensory equipment, passes.

11. An aircraft according to claim 9 wherein the cowling assembly is a nose cap assembly for the aircraft.

* * * * *

UNITED STATES PATENT AND TRADEMARK OFFICE
CERTIFICATE OF CORRECTION

PATENT NO. : 7,570,475 B2  Page 1 of 1
APPLICATION NO. : 11/481695
DATED : August 4, 2009
INVENTOR(S) : Martin Cann It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 370 days.

Signed and Sealed this

Seventh Day of September, 2010

David J. Kappos
*Director of the United States Patent and Trademark Office*